United States Patent
Horne et al.

(10) Patent No.: US 9,221,554 B2
(45) Date of Patent: Dec. 29, 2015

(54) RUNWAY OVERRUN MONITOR

(71) Applicant: Gulfstream Aerospace Corporation, Savannah, GA (US)

(72) Inventors: Thomas Horne, Savannah, GA (US); Thomas Landers, Savannah, GA (US); John Mayo, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/088,544

(22) Filed: Nov. 25, 2013

(65) Prior Publication Data
US 2014/0257601 A1 Sep. 11, 2014

Related U.S. Application Data

(60) Provisional application No. 61/773,646, filed on Mar. 6, 2013.

(51) Int. Cl.
*G06F 19/00* (2011.01)
*B64D 45/00* (2006.01)
*B64D 45/04* (2006.01)
*B64C 25/42* (2006.01)

(52) U.S. Cl.
CPC ................ *B64D 45/00* (2013.01); *B64D 45/04* (2013.01); *B64C 25/426* (2013.01); *B64D 2045/008* (2013.01)

(58) Field of Classification Search
CPC ..... B64D 45/08; G05D 1/0676; G08G 5/025; G08G 5/0021; G01C 23/005; G01S 13/913
USPC ..................... 701/16; 340/951, 972
See application file for complete search history.

(56) References Cited

U.S. PATENT DOCUMENTS

| 5,968,106 A * | 10/1999 | DeVlieg et al. .................. 701/70 |
| 6,722,610 B1 * | 4/2004 | Rawdon et al. .......... 244/103 W |
| 6,978,205 B2 * | 12/2005 | Ryan et al. ..................... 701/120 |
| 7,085,630 B2 * | 8/2006 | Ryan et al. ..................... 701/16 |
| 7,720,579 B2 * | 5/2010 | Goodman et al. .............. 701/16 |
| 7,885,734 B2 | 2/2011 | Lemoult et al. |
| 7,916,042 B2 * | 3/2011 | Constans ..................... 340/945 |
| 8,126,600 B2 | 2/2012 | Conner et al. |
| 8,209,072 B2 | 6/2012 | Villaume et al. |

(Continued)

OTHER PUBLICATIONS

United States International Searching Authority, International Search Report and Written Opinion for International Application No. PCT/US14/18714, mailed Jul. 11, 2014.

*Primary Examiner* — Tuan C. To
*Assistant Examiner* — Shardul Patel
(74) *Attorney, Agent, or Firm* — Ingrassia, Fisher & Lorenz PC

(57) ABSTRACT

Disclosed is a runway alerting method and system for an aircraft performing a landing maneuver. During the landing maneuver, a minimum stopping position and a maximum stopping position for the aircraft along the runway is determined using aircraft energy state, deceleration and braking information. The minimum stopping position is based upon the aircraft performing a maximum flare maneuver prior to touchdown on the runway and the maximum stopping position is based upon the aircraft performing a minimum flare maneuver prior to touchdown on the runway. The minimum and maximum stopping positions are presented to the aircraft pilot on a display to assist the pilot in safely landing the aircraft.

23 Claims, 6 Drawing Sheets

(56) References Cited

U.S. PATENT DOCUMENTS

| | | |
|---|---|---|
| 8,380,372 B2 | 2/2013 | Michal et al. |
| 8,428,795 B2 * | 4/2013 | Caule ............................. 701/16 |
| 8,774,989 B1 * | 7/2014 | Bush et al. ..................... 701/14 |
| 2001/0052562 A1 * | 12/2001 | Ishihara et al. ............... 244/175 |
| 2004/0044446 A1 * | 3/2004 | Staggs ........................... 701/16 |
| 2004/0167685 A1 * | 8/2004 | Ryan et al. ..................... 701/16 |
| 2005/0128063 A1 | 6/2005 | Isaji et al. |
| 2005/0261813 A1 * | 11/2005 | Ryan et al. ..................... 701/16 |
| 2005/0270180 A1 * | 12/2005 | Ishihara et al. ............... 340/968 |
| 2006/0195235 A1 | 8/2006 | Ishihara et al. |
| 2007/0208466 A1 * | 9/2007 | Meunier ......................... 701/16 |
| 2008/0012729 A1 * | 1/2008 | Constans ....................... 340/973 |
| 2008/0162092 A1 * | 7/2008 | Coulmeau et al. ............. 703/2 |
| 2008/0195301 A1 * | 8/2008 | Fabre et al. ................... 701/120 |
| 2010/0036552 A1 * | 2/2010 | Pepitone et al. ............... 701/18 |
| 2010/0299005 A1 | 11/2010 | Hugues |
| 2011/0130913 A1 * | 6/2011 | Duggan et al. ................. 701/23 |
| 2011/0166723 A1 * | 7/2011 | Valentova et al. ............. 701/16 |
| 2012/0133529 A1 * | 5/2012 | He ................................ 340/977 |
| 2012/0158222 A1 * | 6/2012 | Ehlin et al. ..................... 701/16 |
| 2013/0204470 A1 * | 8/2013 | Luckner et al. ................ 701/18 |
| 2013/0261855 A1 * | 10/2013 | DeGagne et al. .............. 701/16 |

\* cited by examiner

RUNWAY OVERRUN MONITOR

RELATED APPLICATION

This application claims the benefit of U.S. Provisional Application No. 61/773,646 filed Mar. 6, 2013.

TECHNICAL FIELD

The technical field generally relates to aircraft, and more particularly relates to methods and apparatus for advising a pilot of an aircraft of the predicted runway stopping point of an aircraft during approach and landing.

BACKGROUND

A pilot attempting to land an aircraft during flight is presented with several challenges to perform a safe landing maneuver. During a landing maneuver, the aircraft must properly approach an airport runway along a glideslope, touchdown aligned with the runway and slow to a stop or an appropriate ground speed within the runway distance remaining after touchdown. While there have been significant advances in aircraft navigation and landing guidance and control systems, if the pilot of an aircraft attempts to land from a non-optimal height or speed, the runway distance may be insufficient to provide the required landing distance for the aircraft.

In addition to aircraft speed and altitude, additional factors are commonly evaluated by the pilot during the approach and landing process. These factors may include aircraft operation (e.g., malfunctions), excessive wind conditions or contaminated runway conditions. If the pilot does not accurately estimate the energy of the aircraft and remaining length of the runway, a runway overrun is possible.

Pilots are trained to monitor these conditions during the approach, and to initiate a go-around maneuver if necessary. However, the decision to execute a go-around maneuver is left to the discretion of the pilot. Accordingly, the effectiveness of a pilot in safely landing the aircraft depends on the experience and judgment of the pilot. Accordingly, pilots with varying levels of experience and training may respond differently to the same situation, and some pilot responses may result in a less than optimal landing.

Accordingly, it is desirable to assist a pilot during the approach and landing phase of flight. It is further desirable that the assistance be as objective as possible and not dependent upon pilot skill or judgment. Other desirable features and characteristics will become apparent from the subsequent summary and detailed description and the appended claims, taken in conjunction with the accompanying drawings and the foregoing technical field and background.

SUMMARY

In one embodiment, a runway alerting method for a landing aircraft by determining stopping positions for the aircraft along the runway using aircraft deceleration and braking information and displaying the stopping positions on a display.

In another embodiment, a system is provided that includes, but is not limited to an aircraft system that includes a first apparatus that is configured to determine an aircraft speed relative to the ground, a second apparatus that is configured to determine the aircraft's position, and a third apparatus that can provide information about the runway of intended landing. A flight system coupled to the first apparatus and the second apparatus that is configured to activate a runway overrun monitor system for the aircraft as the aircraft approaches the runway. Next the flight system determines a minimum stopping position for the aircraft along the runway using the aircraft speed and the predicted position and determines a corporate stopping position for the aircraft along the runway using the aircraft speed and the predicted position. The minimum stopping position and the corporate stopping position are presented to the aircraft pilot on a display to as assist the pilot in safely landing the aircraft.

DESCRIPTION OF THE DRAWINGS

Embodiments of the present invention will hereinafter be described in conjunction with the following drawing figures, where like numerals denote like elements, and.

DETAILED DESCRIPTION

As used herein, the word "exemplary" means "serving as an example, instance, or illustration." The following detailed description is merely exemplary in nature and is not intended to limit application and uses. Any embodiment described herein as "exemplary" is not necessarily to be construed as preferred or advantageous over other embodiments. All of the embodiments described in this Detailed Description are exemplary embodiments provided to enable persons skilled in the art to make or use the embodiment and not to limit the scope that is defined by the claims. Furthermore, there is no intention to be bound by any expressed or implied theory presented in the preceding technical field, background, summary or the following detailed description.

Figure 1:
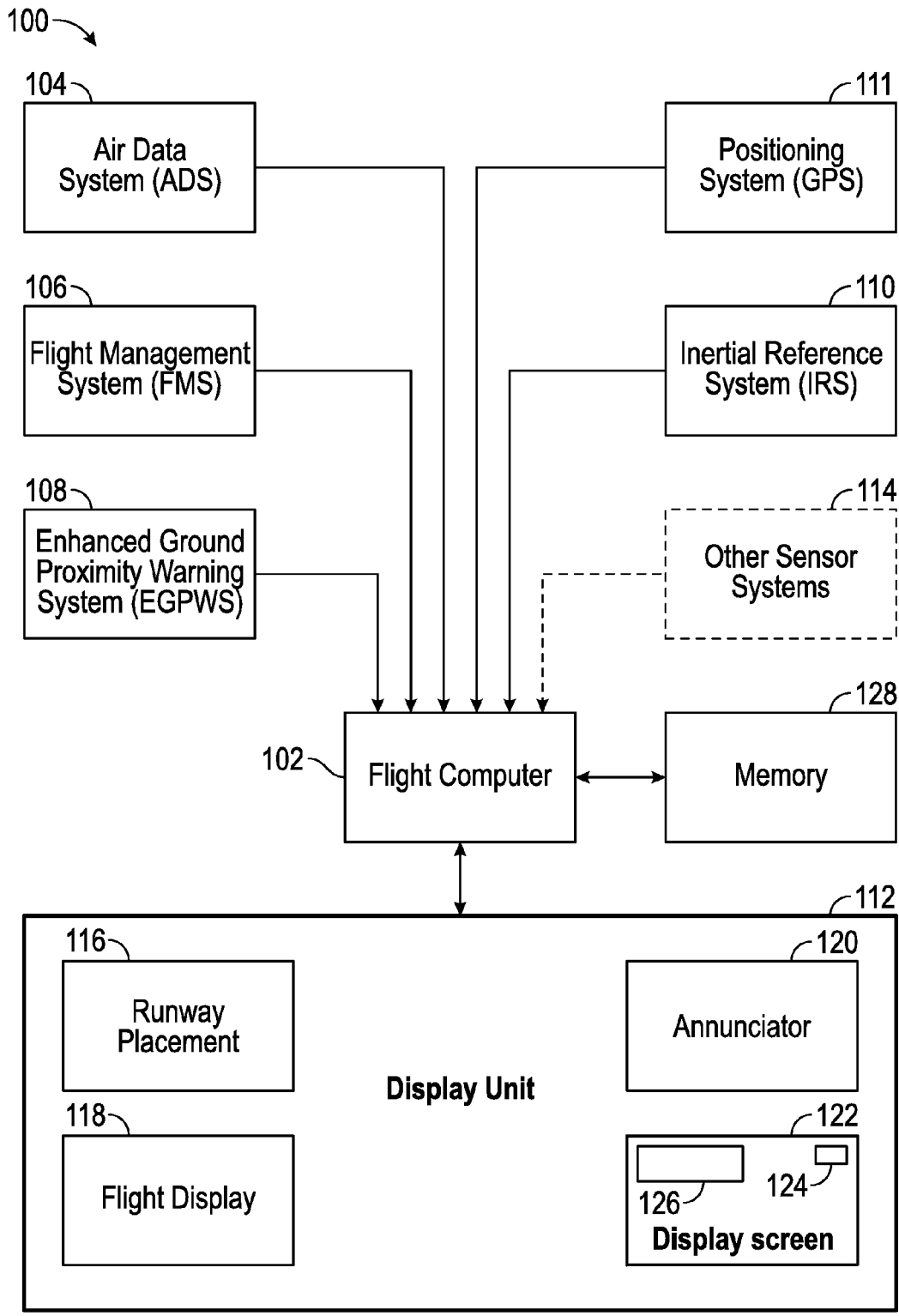
FIG. 1 is a block diagram of various aircraft flight systems in accordance with an embodiment.

FIG. 1 is block diagram of various flight systems 100 for an aircraft that implements a runway overrun monitor system and/or is capable of executing a runway overrun monitor method in accordance with exemplary embodiments. The various flight systems 100 includes a flight computer 102, an Air Data System (ADS) 104, a Flight Management System (FMS) 106, an Enhanced Ground Proximity Warning System (EGPWS) 108, an Inertial Reference System (IRS) 110, a Positioning System 111 (e.g., GPS, GLONASS or Galileo) and a display unit 112. Optionally, other proprietary or commercial sensor systems 114 provide additional input signals to the flight computer 102, such as, for example, a weight-on-wheels (WOW) sensor.

The FMS 106 is configured to provide to the flight computer 102 data regarding the flight including a landing approach plan, while the EGPWS 108 provides the flight computer 102 with a geometric altitude, where the geometric altitude is based on a three-dimensional model of terrain. The ADS 104, the FMS 106, the EGPWS 108, and the IRS 110 are disposable within the flight computer 102 or within other avionics shown in FIG. 1 or at other locations in an aircraft.

The display unit 112 displays information regarding the status of the aircraft. The display unit 112 receives input from various systems to provide information to the pilot. For example, the EGPWS 108 generates information for a runway placement display 116 to the pilot regarding the geometric altitude position of the aircraft with respect to the runway.

The display unit 112 typically also includes, but is not limited to an annunciator 120 to provide verbal warnings, alert or warning tones or other audible information. The display screens 122 of the display unit 112 include icons 124 that are illuminated to indicate the occurrence of certain conditions and a text message screen 126 to display text information.

In accordance with one embodiment, the various flight systems 100 illustrated in FIG. 1 is implemented with software and/or hardware modules in a variety of configurations. For example, flight computer 102 comprises one or more processors, software module or hardware modules. The processor(s) reside in single integrated circuits, such as a single or multi-core microprocessor, or any number of integrated circuit devices and/or circuit boards working in cooperation to accomplish the functions of the flight computer 102. The flight computer 102 is operable coupled to a memory system 128, which may contain the software instructions or data for the flight computer 102, or may be used by the flight computer 102 to store information for transmission, further processing or later retrieval. In accordance with one embodiment, the memory system 128 is a single type of memory component, or composed of many different types of memory components. The memory system 128 can include non-volatile memory (e.g., Read Only Memory (ROM), flash memory, etc.), volatile memory (e.g., Dynamic Random Access Memory (DRAM)), or some combination of the two. In an embodiment, the runway overrun monitor system is implemented in the flight computer 102 via a software program stored in the memory system 128.

Although not illustrated in FIG. 1, it will be appreciated that each of the various flight systems 100 typically includes one or more sensors. In general, a sensor is a device that measures a physical quantity and converts the measurement into a signal received by a system or the flight computer 102. In general, sensors are used to sense any number of physical quantities, such as light, motion, temperature, magnetic fields, gravitational forces, humidity, vibration, pressure, electrical fields, current, voltage, sound, and other physical aspects of the aircraft or a surrounding environment. Non-limiting examples of sensors include, but is not limited to weight-on-wheel sensors, vibration sensors, air speed sensors, altimeter, gyroscope, inertial reference unit, magnetic compass, navigation instrument sensors, throttle position sensor, pitch, roll and yaw sensors, etc.

According to exemplary embodiments, a runway overrun monitor is provided that computes or predicts stopping points on the runway. A first stopping point is the minimum stopping distance computed using a maximum deceleration value that the aircraft is capable of achieving. A second stopping point (sometimes referred to as a "corporate stop") is computed using a reduced deceleration capability that might be expected when only using alternative deceleration devices, such as thrust reversers or a reduced braking capability consistent with the design of the aircraft. Some embodiments include additional stopping points as selected by the pilot, based upon integration with an aircraft autobrake system. Thus, the deceleration capabilities of the aircraft are known, and may be determined during flight testing or validation of the aircraft. In some embodiments, the aircraft deceleration information, inertial three-dimensional (horizontal and vertical) velocities, inertial three-dimensional position, runway start and end points, runway heading, runway glideslope angle, runway slope, and weight-on-wheels sensors are used by the runway overrun monitor.

Figure 2:
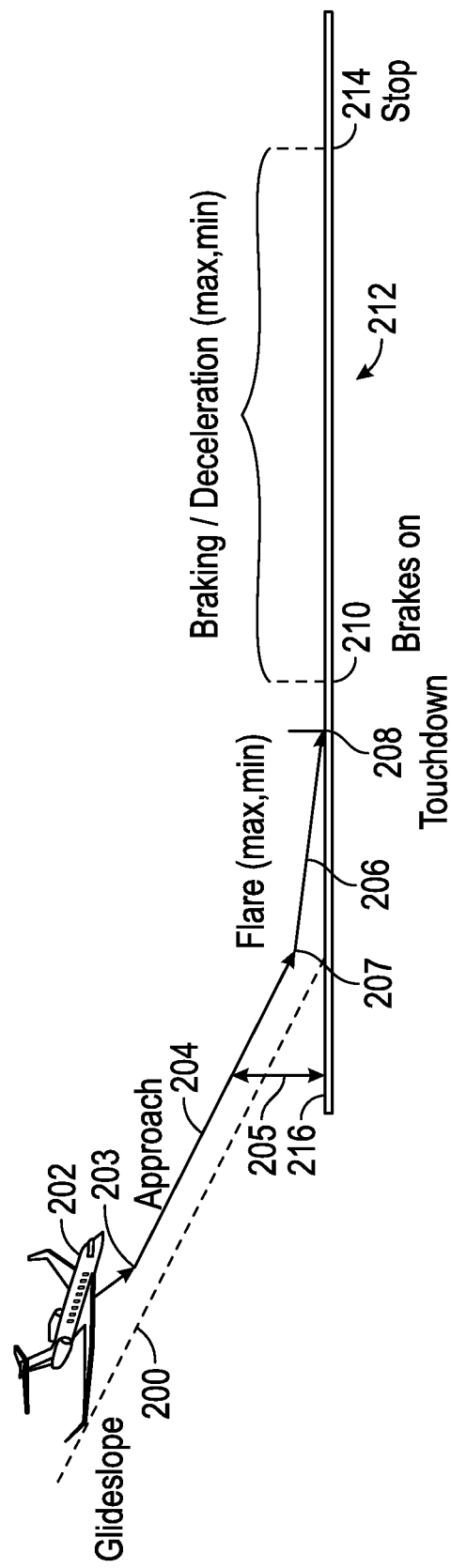
FIG. 2 illustrates a landing approach of an aircraft in accordance an embodiment.

FIG. 2 illustrates a glideslope 200 for an aircraft 202 executing an approach 204 and landing utilizing the runway overrun monitor system in accordance with an embodiment.

As can be seen, in the example of FIG. 2 the approach 204 of the aircraft 202 is slightly higher than the ideal glideslope 200. Typically, at approximately 1000-2000 feet (approximately 304.8-609.6 meters) above the runway, the runway overrun monitor system activates (or is activated by the pilot), and the flight computer 102 and the display unit 112 (shown in FIG. 1) begin to provide the pilot with the necessary awareness to allow aligning the aircraft with the landing approach plan and correcting any deviation of the aircraft along the glideslope 200. At a point 205 in approach 204 (e.g., at approximately 500 feet), a "go around" advisory from the runway overrun monitor system activates if conditions are met for this warning. In some embodiments, the runway overrun monitor system is manually activated by the pilot or co-pilot. Preferably, in manual activation embodiments, activation by the pilot or co-pilot is part of an approach and landing Standard Operation Procedure (SOP) available to the flight crew. In some embodiments, activation of the runway overrun monitor system is automatic, such as by the flight computer 102 as shown in FIG. 1, at some point in approach segment 204.

Once activated, the runway overrun monitor system is processing operational parameters of the aircraft to compute the minimum and corporate stopping positions on the runway, and optionally, additional stopping points as desired for any particular implementation. As the aircraft 202 continues to descend along the glideslope 200 during the approach 204, the pilot of the aircraft will execute a flare maneuver during segment 206 where the nose of the aircraft is slightly elevated to reduce the descent rate of the aircraft. In some embodiments, a minimum flare (least amount of time and runway used) and a maximum (or corporate) flare (more time and runway usage, along with increased passenger comfort) is also used to compute the minimum and corporate stopping points on the runway along with the known aircraft deceleration information. In such embodiments, the minimum flare and the maximum deceleration (braking effort) are used to compute the minimum stopping point. Also the maximum (corporate) flare and minimum (corporate) deceleration are used to compute the corporate stopping point. At point 208, the aircraft touches down, which can be determined by a conventional weight-on-wheels sensor, or other means. Next, the pilot applies braking systems at point 210 and the aircraft slows during the braking (deceleration) period 212 until the stop point 214. After the aircraft comes to a stop, the runway overrun monitor system may be manually or automatically deactivated.

Between activation and deactivation, the runway overrun monitor system provides the pilot with graphical indications and potential warnings if the corporate stopping point or the minimum stopping point exceeds the remaining available runway which may create the potential for the aircraft to overrun the runway. Thus, the runway overrun monitor increases pilot awareness of the stopping potential of the aircraft and additionally provides warnings to facilitate a safe aircraft stop within the remaining available runway, or to support pilot decision making about the practicality of continuing the landing attempt.

Figure 3A:
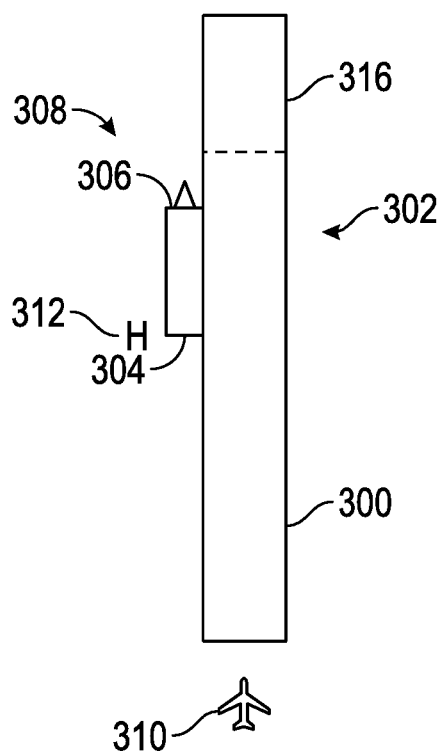
FIGS. 3A-C, 4A-B and 5A-B are illustrations of a graphical indication provided by an embodiment.
Figure 3B:
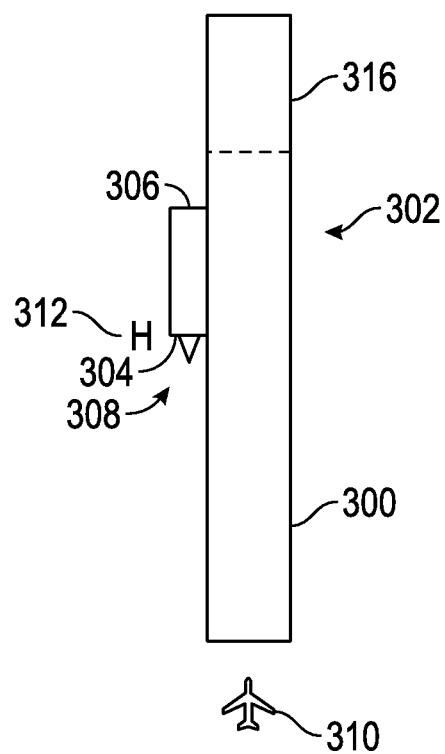
Figure 3C:
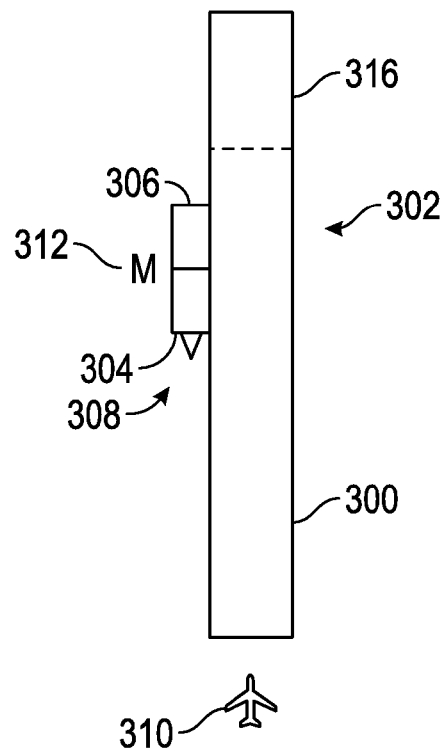

FIGS. 3A-C are illustrations of exemplary graphical indications that may be provided to the pilot such as on the display screen 122 of FIG. 1. As can be seen, a runway depiction 300 is provided. In the illustrated embodiment, an overlay 302 indicates both the computed (or predicted) maximum effort stopping point 304 and the corporate stopping point 306. Accordingly, to exemplary embodiments, the maximum effort stopping point 304 and the corporate stopping point 306 are computed (predicted) using equation (1)

$$\text{Stopping point} = Brk_{on}Pt + \frac{V^2}{2 \times |A|} \quad (1)$$

Where:

$Brk_{on}Pt$ is the position on the runway (distance from runway start) where the brakes are predicted to be applied;

V is the lessor of the actual aircraft speed and the predicted velocity of the aircraft at the brakes-on point, as determined by aircraft speed sensors and assumptions of speed loss before the brakes are applied; and

|A| is the absolute value of the acceleration (deceleration being a negative value) using either the maximum deceleration or the corporate deceleration depending on which predicted stopping point is being computed.

During some landings, the deceleration is not constant over the braking/deceleration segment, and may be decomposed into multiple segments by using the following more complex set of equations:

$$T_{xover} = \frac{\max(0, V - V_{xover})}{|A_{xover}|} \quad (2)$$

$$X_1 = V \times T_{xover} - \frac{|A_{xover}| \times T_{xover}^2}{2} \quad (3)$$

$$X_2 = \frac{\min(V, V_{xover})^2}{2 \times |A|} \quad (4)$$

$$\text{Stopping point} = Brk_{on}Pt + X_1 + X_2 \quad (5)$$

Where $|A_{xover}|$ is the absolute value of the acceleration in the first segment of braking (deceleration being a negative value) using either the maximum deceleration or the corporate deceleration depending on which predicted stopping point is being computed.

$V_{xover}$ is the speed where the deceleration transitions from $A_{xover}$ to A.

Some embodiments may extend this to three or more segments of braking/deceleration, depending on the actual deceleration characteristics of the aircraft and the potential improvement in accuracy versus the ability to manage the additional complexity of computations. In addition, the accuracy of the computation may be improved by having the values of A and Axover be functions of some known elements of runway geometry, such as the runway slope or the height of the runway above mean seal level.

The brake on point ($Brk_{on}Pt$) in equation (1), (210 in FIG. 2) is computed using equation (6);

$$Brk_{on}Pt = TouchdownPt + V_{td} * T_{bo} \quad (6)$$

Where:

TouchdownPt is the position on the runway (distance from runway start) where the aircraft is predicted to touchdown, or the current position if the aircraft is already on the runway;

$V_{td}$ is the predicted velocity of the aircraft at the touchdown point, as determined by aircraft speed sensors and assumptions of expected speed loss during the flare (in some exemplary uses the speed loss could be 5 knots a maximum flare, and 0 knots for a minimum flare, where the assumed speed loss could be a function of height above the runway, up to a maximum height of the assumed flare height, to denote how much of the flare is complete); and $T_{bo}$ is the time from touchdown until the brakes are applied, which could be determined from the time since the aircraft has touched down on the runway, but limited to a lower limit to allow for pilot reaction time and to provide a level of conservatism once the aircraft is on the runway (in some exemplary uses the time could be 3.5 seconds until the aircraft is on the runway, and then reduces at 1 second per second to a minimum value of 1 second).

The touchdown point in equation (6), and as indicated as 208 in FIG. 2, is computed using equation (7);

$$TouchdownPt = FlarePt + V_{flare} * T_{flare} \quad (7)$$

Where:

FlarePt is the predicted location where the flare will begin (207 in FIG. 2), typically as indicated in a change in the aircraft descent angle from following the typical glideslope to a more shallow angle (in some exemplary embodiments, this may be based on a prediction of where the aircraft will be positioned when 75 feet above the runway), or once the aircraft has begun the flare, is the current position of the aircraft;

$V_{flare}$ is the predicted velocity of the aircraft in the flare, which in some exemplary embodiments is set to the aircraft inertial speed less a percentage of speed that is predicted to be lost during the flare; and $T_{flare}$ is the time the aircraft is expected to be in the flare, which in some exemplary uses is based on the height of the aircraft above the runway, with an upper limit of $H_{flare}$ (as explained below) and could use different values to compute a maximum flare and a minimum flare.

The accuracy of the computation may be improved by having the values of $V_{flare}$ and $T_{flare}$ computed as functions of some known elements of runway geometry, such as the runway slope or the height of the runway above mean seal level.

The computed value TouchdownPt, depending the aircraft's position relative to the runway, could be before the beginning of the runway (216 in FIG. 2). In order to prevent a false sense of stopping capability that could be created by taking credit for landing before the beginning of the runway, the value of TouchdownPt is limited to be not less than a reasonable distance from the beginning of the runway. In some exemplary embodiments, this distance might be on the order of 500 feet.

When the computed value of TouchdownPt is determined to be too close to the beginning of the runway, indicating a low energy state of the aircraft as might be typified by being significantly below the glideslope, an annunciation may be provided to the flight crew to alert them to a below glideslope condition.

The flare point in equation (7) (207 in FIG. 2), is computed using equation (8);

$$FlarePt = ApproachPt + \frac{\max(0, H_{app} - H_{flare})}{\tan(\text{Glidescope angle})} \quad (8)$$

Where:

ApproachPt is the predicted location where the aircraft will begin the approach segment, as typified by paralleling the glideslope (204 in FIG. 2).

$H_{app}$ is the predicted height of the aircraft at the beginning of the approach segment $H_{flare}$ is the height that the aircraft is predicted to begin the flare maneuver, and may have a different value for the maximum performance and corporate stop computations.

Glideslope angle is the known angle of the glideslope (200 in FIG. 2) relative to the horizontal.

It is assumed that the aircraft may or may not follow the trajectory as shown in FIG. 2 that parallels the glideslope (204 in FIG. 2), since the pilot will typically continue to correct the aircraft's position until it is on the glideslope (200 in FIG. 2). However, it is this assumption that enables the computation of the stopping point (214 in FIG. 2) to reflect the increased potential energy of an aircraft that is above the desired glideslope, or the decreased potential energy of an aircraft that is below the desired glideslope.

The approach point in equation (8) (203 in FIG. 2), is computed using equation (9);

$$\text{ApproachPt} = \text{Present position} + V_{curr} * T_{corr} \quad (9)$$

Where:

Present position currently measured location of the aircraft (as indicated as 202 in FIG. 2), relative to the beginning of the runway and rotated to a coordinate system that is parallel to the runway in use. This would mean that the present position would be zero at the beginning of the runway, and at the end of the runway it would be equal to the runway length;

$V_{curr}$ is the current inertial speed of the aircraft; and $T_{corr}$ is the time the aircraft is predicted to follow its current trajectory. This value is chosen as a tunable parameter (in some exemplary uses this value could be set to 1 second).

The approach height ($H_{app}$) in equation (8) (203 in FIG. 2), is computed using equation (10);

$$H_{app} = \max(0, \text{Present height} + \text{VerticalSpeed} * T_{corr}) \quad (10)$$

Where:

Present height is the currently measured height of the aircraft above the runway. Specifically, in the case of a sloped runway, it should be computed as the height above the intended touchdown point (typically 1,000-1,500 feet from the beginning of the runway (216 in FIG. 2)). In some exemplary embodiments, this may be based on the relative inertial height when the aircraft is a significant distance from the runway, and could transition to a value based on a radio altimeter indication once the aircraft is closer to the runway.

Vertical speed is the current inertial vertical speed of the aircraft; and $T_{corr}$ is the time the aircraft is predicted to follow its current trajectory. This value is chosen as a tunable parameter (in some exemplary uses this value could be set to 1 second).

Referring still to FIGS. 3A-C, as the aircraft reduces speed, the velocity term (V) in equation (1) will be reducing, thus shortening the predicted stopping distance. To provide an indication of this information to the pilot, trend arrows 308 provide an indication as to whether these predicted stopping points are trending further down the runway or trending toward the aircraft being able to stop within the remaining runway distance. Thus, if the aircraft were at its typical approach speed, but increasing in speed, the trend arrows 308 may be pointed toward the end of the runway depiction 300 as shown in FIG. 3A. However FIG. 3B shows a condition, for example, where the pilot is slowing to correct the speed of the aircraft, and the trend arrows 308 indicate that his ability to stop the aircraft on the runway is improving. In this scenario, no warning messages were required, and ideally, all landings and aircraft stops occur following FIGS. 3A and 3B.

Additional indications are shown in FIGS. 3A-C. A depiction of the aircraft position 310 provides the relative location of the aircraft to the runway start and end points. The aircraft position 310 translates along the lateral and vertical axis of the display during approach and landing, thereby providing the pilot with situational awareness of relative aircraft position to predicted stopping point.

A runway buffer 316 (horizontal dashed line) is depicted in FIGS. 3A-C, and is nominally the one-thousand foot remaining marker. However, in some embodiments, this buffer line can be pilot selectable as a desired runway stopping point. This capability allows the pilot to pre-select a stopping point that may correspond to desired taxi way exit point from the runway, or provide a safety margin. The pilot can then monitor the display and adjust aircraft approach and landing performance to meet the desired runway stopping point.

If the aircraft is equipped with an autobrake system, then a label indicating the brake setting is depicted in autobrake label 312. An aircraft autobrake system allows the pilot to select braking deceleration characteristics ranging from low (L) to medium (M) to high (H). The minimum stopping point 304 corresponds to the high (H) autobrake setting. FIG. 3C shows a depiction of a medium (M) braking deceleration selected by the pilot. A similar embodiment would be presented for a low (L) or other autobrake setting. The pilot would anticipate that a runway overrun could occur if either the minimum stopping point 304 or the autobrake setting stopping point 312 were to exceed the end of the runway.

Figure 4A:
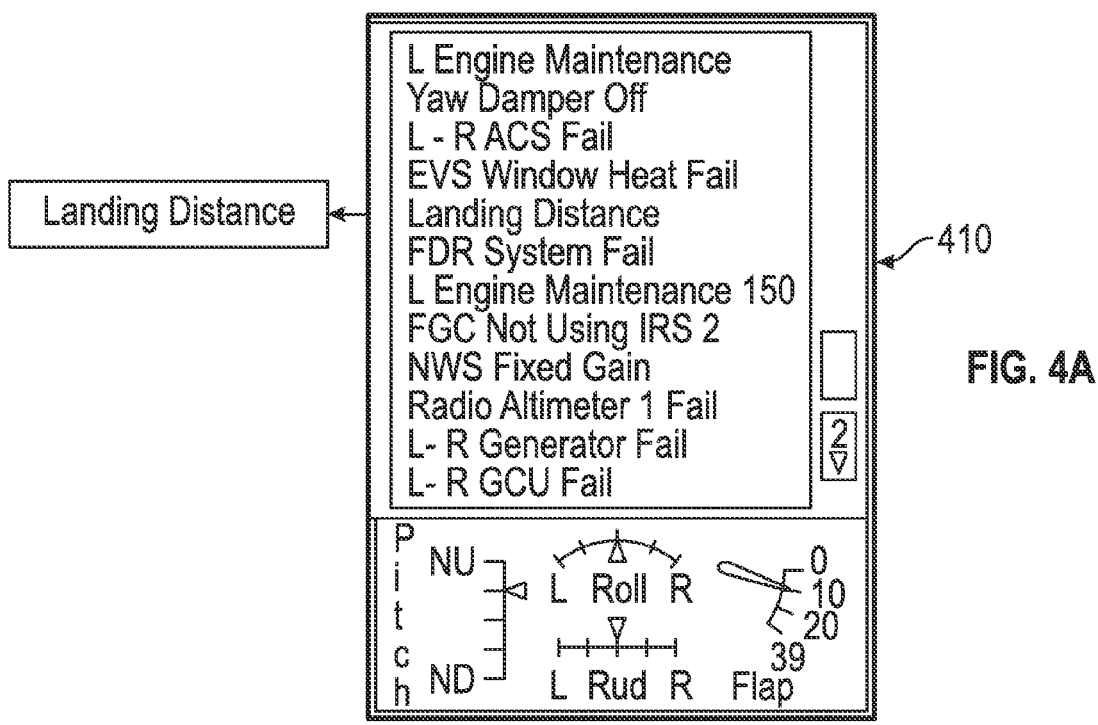
Figure 4B:
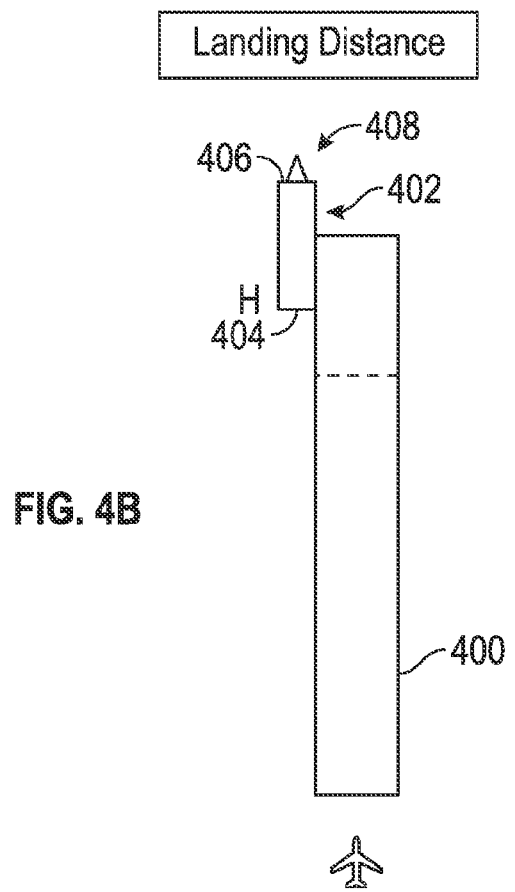

Referring to FIG. 4, in some circumstances, the aircraft may be too high above the glideslope (200 as shown in FIG. 2) or may be too high of a speed or both (sometimes referred to as the aircraft being "high and hot"), causing the potential for a runway overrun. Thus, in FIG. 4, the overlay 402 indicates the predicted corporate stopping point 406 exceeds the available runway. However, the minimum stopping point 404 is still shown on the runway indicating that the pilot will need a significant amount of brake application to avoid the potential of overrunning the runway (unless a correction to the speed or glideslope deviation can be made before touchdown). In this circumstance the color of the runway depiction 400 may change to amber or some other color indicative a caution. Additionally, a Crew Alerting System (CAS) message may be provided as shown at 410.

Figure 5A:
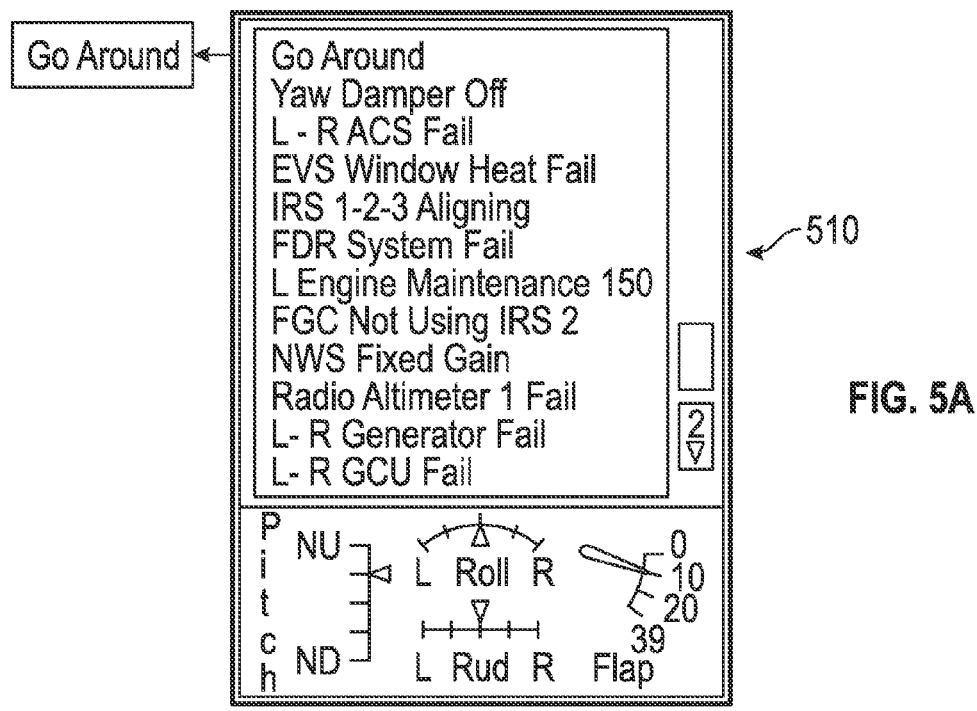
Figure 5B:
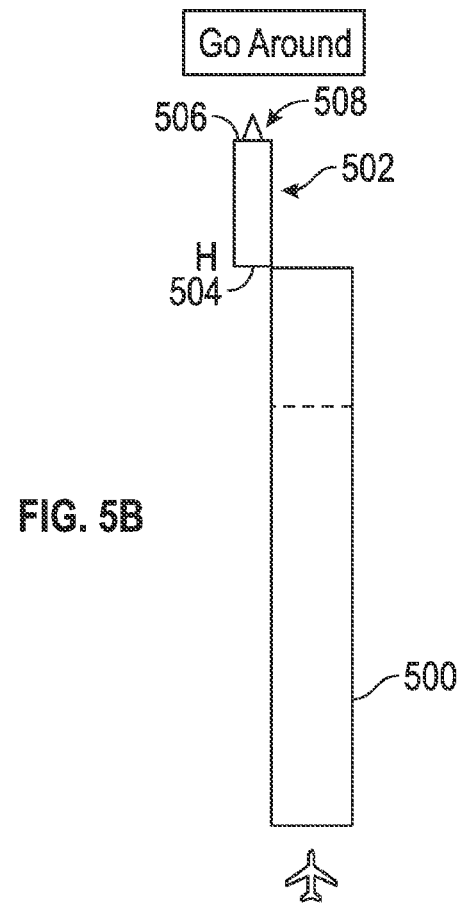

In FIG. 5, a more serious scenario is illustrated where the runway overrun monitor predicts that both the corporate stopping point 506 and the minimum stopping point 504 will exceed the available remaining runway. In this circumstance, the runway depiction 500 may change to a red color and a "Go Around" message displayed above the runway depiction as well as in the CAS display as shown at 510. This indicates to the pilot that a go-around maneuver should be executed, and the pilot should declare a missed approach.

Figure 6:
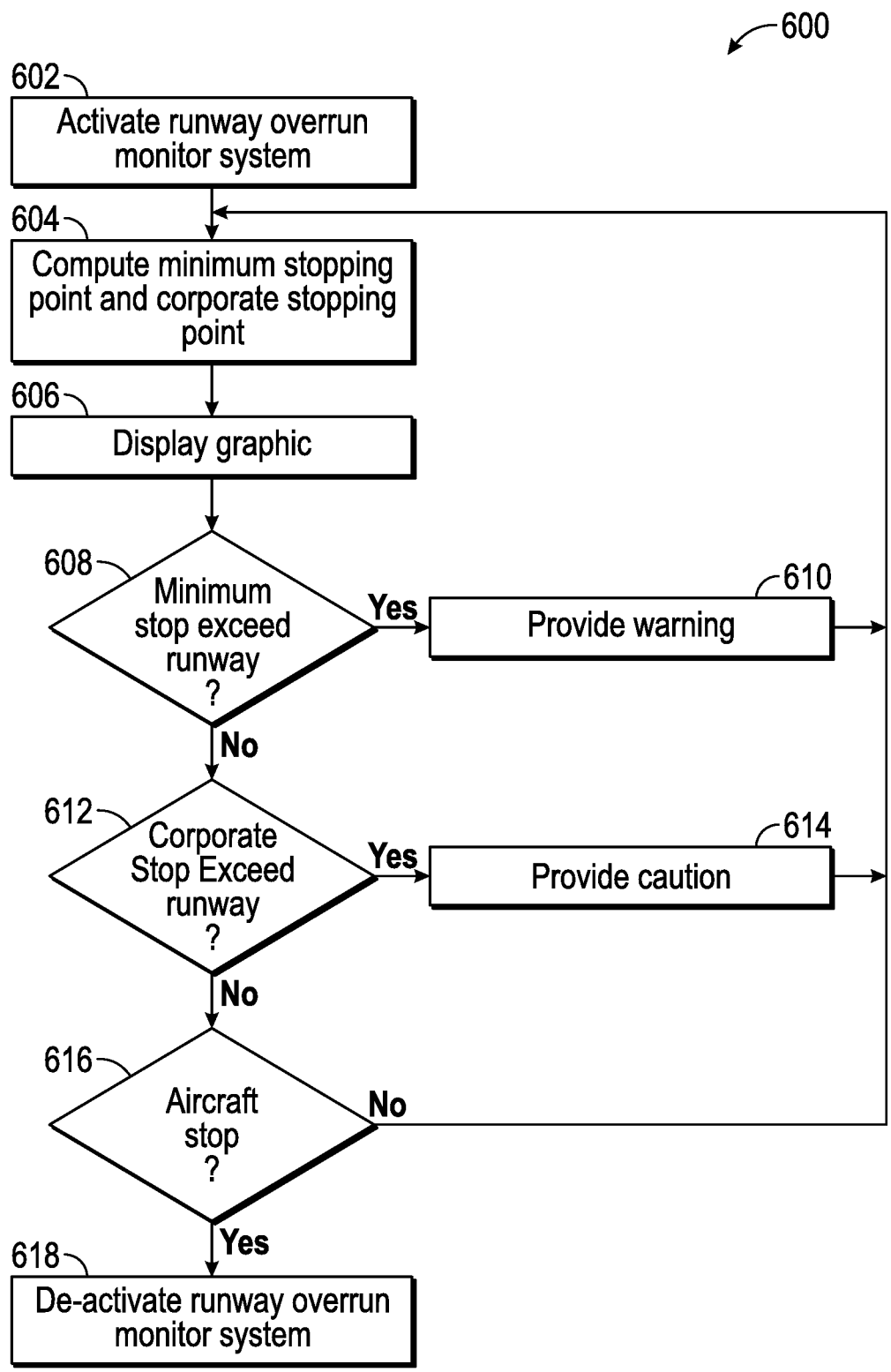
FIG. 6 is a flowchart of a method in accordance with an embodiment.

FIG. 6 is a flowchart of a method 600 performed by the runway overrun monitor system in accordance with an embodiment. In one embodiment, the various tasks performed in connection with the method 600 of FIG. 6 are performed by software executed in a processing unit, hardware, firmware, or any combination thereof. For illustrative purposes, the following description of the method 600 of FIG. 6 refers to elements mentioned above in connection with FIG. 1 to FIG. 5.

In an embodiment, portions of the method of FIG. 6 performed by different elements of the described system. However, in accordance with another embodiment, portions of the method of FIG. 6 are performed by a single element of the described system.

It should also be appreciated that the method of FIG. 6 may include no additional or alternative tasks or may include any number of additional or alternative tasks, and that the method of FIG. 6 may be incorporated into a more comprehensive procedure or process having additional functionality not described in detail herein or implemented as a stand-alone procedure. Moreover, one or more of the tasks shown in FIG. 6 are removable from an embodiment of the method 600 of FIG. 6 as long as the intended overall functionality remains intact.

The routine begins in step 602 with an activation of the runway overrun monitor system. In some embodiments, the runway overrun monitor system is manually or automatically activated at an altitude of approximately 2000 feet above the runway. After activation of the runway overrun monitor system, step 604 computes the minimum stopping point and the corporate stopping point of the aircraft as discussed above in connection with equation (1), as well as any other stopping points based on autobrake settings or other deceleration factors. Step 606 displays one of the graphic indications as discussed above in connection with FIGS. 3-5. Next, decision 608 determines whether the aircraft has a predicted minimum stopping point that will exceed the runway. If so, then a warning is give in step 610 and the routine continues to compute or predict the aircraft stopping points until the approach is aborted and the aircraft executes a go-around maneuver. If not, then decision 612 determines whether the corporate stopping point will exceed the remaining available runway. If so, step 614 provides a caution message for landing distance, so that the pilot will understand to apply some level of aircraft braking to avoid the potential for overrunning the runway. A caution condition may also be indicated if the computed minimum stopping point exceeds the runway buffer distance (316 on FIG. 3) as set by the operator.

If both the minimum stopping point and the corporate stopping point are predicted not to exceed the runway (FIGS. 3A-C), decision 616 determines whether the aircraft has come to a stop, or nearly so as indicated by inertial speed below a threshold value, or taxied off of the runway. If so, the runway overrun monitor system deactivates in step 618 and the routine ends.

The disclosed methods and systems provide a runway overrun monitor system for an aircraft that enhances safe air travel by augmenting pilot judgment with an objective determination of whether an aircraft can safely stop on a runway. This provides increased pilot awareness during a landing maneuver, and cautions or warnings are provided if the pilot need take additional stopping efforts or perform a go-around maneuver.

It will be appreciated that the various illustrative logical blocks/tasks/steps, modules, circuits, and method steps described in connection with the embodiments disclosed herein may be implemented as electronic hardware, computer software, or combinations of both. Some of the embodiments and implementations are described above in terms of functional and/or logical block components or modules and various processing steps. However, it should be appreciated that such block components or modules may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope as set forth in the claims. For example, an embodiment of a system or a component may employ various integrated circuit components, for example, memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), analog computing device, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word exemplary is used exclusively herein to mean serving as an example, instance, or illustration. Any embodiment described herein as "exemplary" is not necessarily to be construed as preferred or advantageous over other embodiments.

The steps of a method described in connection with the embodiments disclosed herein may be embodied directly in hardware, in a software module executed by a processor, or in a combination of the two, or by some other electronic means. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as first, second, third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as connect or coupled to that are used in describing a relationship between different elements does not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments.

What is claimed is:

1. In an aircraft performing a landing maneuver on a runway, a runway alerting method for the aircraft comprising: (a) receiving, by a processor, information from sensors onboard the aircraft during the landing maneuver; (b) determining, in the processor, a minimum stopping position and a maximum stopping position for the aircraft along the runway using aircraft energy, deceleration and braking information, the minimum stopping position being determined based upon the aircraft performing a maximum flare maneuver prior to touchdown on the runway and the maximum stopping position being determined based upon the aircraft performing a minimum flare maneuver prior to touchdown on the runway, and wherein the minimum stopping position and the corporate maximum stopping position are determined using the equation:

$$\text{Stopping point} = Brk_{on}Pt + \frac{V^2}{2 \times |A|}$$

where: $Brk_{on}Pt$ is the position on the runway (distance from runway start) where deceleration is predicted to begin begins as determined by the second apparatus; V is the speed of the aircraft as determined by the first apparatus; and $|A|$ is the absolute value of the acceleration (deceleration being a negative value) using either the maximum deceleration or the corporate deceleration depending on which predicted stopping point is being computed; (c) controlling, by the processor, a display unit onboard the aircraft to display the minimum stopping position and the maximum stopping position of the aircraft to provide predicted indications of the aircraft position relative to the runway at the conclusion of the landing maneuver; and (d) repeating steps (a) through (c) until the aircraft has completed the landing maneuver.

2. The method of claim 1, wherein the minimum stopping position is determined using a maximum deceleration value for the aircraft.

3. The method of claim 1, wherein the maximum stopping position is determined using a minimum deceleration value for the aircraft.

4. The method of claim 1, wherein additional stopping positions are determined using other aircraft flare and deceleration values for the aircraft.

5. The method of claim 1, further comprising activating a runway overrun monitor system for the aircraft as the aircraft approaches the runway.

6. The method of claim 1, wherein controlling the display unit further comprises the processor controlling the display unit to display a graphical illustration of the runway and displaying an overlay to indicate the minimum stopping positions position and the maximum stopping position relative to a runway end point.

7. The landing method of claim 6, further the processor controlling the display unit to display a trending indication to indicate whether the minimum and maximum stopping positions are trending further down the runway or trending toward the aircraft being able to stop within a remaining runway distance.

8. The method of claim 6, further comprising providing a runway distance caution message when the maximum stopping position exceeds a remaining runway distance and the minimum stopping position remains within the remaining runway distance.

9. The method of claim 6, further comprising providing a runway distance caution message when the minimum stopping position less an operator selected buffer distance exceeds a remaining runway distance, and the minimum stopping position remains within the remaining runway distance.

10. The method of claim 6, further comprising providing a runway distance warning or go-around message when both the maximum stopping position and the minimum stopping position exceed a remaining runway distance.

11. The method of claim 6, further comprising providing an alert message when a predicted touchdown point is too close to an end of the runway.

12. An aircraft comprising: a first apparatus that is configured to determine an aircraft speed relative to the ground while the aircraft is performing a landing maneuver; a second apparatus that is configured to determine a position along a runway when the aircraft is in contact with the ground following touchdown during the landing maneuver; a flight system coupled to the first apparatus and the second apparatus, the flight system configured to: activate a runway overrun monitor system for the aircraft as the aircraft approaches the runway during the landing maneuver; determine a minimum stopping position for the aircraft along the runway using the aircraft speed and the predicted position along a runway when the aircraft begins deceleration, the minimum stopping position based upon the aircraft performing a maximum flare maneuver prior to touchdown on the runway and wherein the minimum stopping position is determined using the equation:

$$\text{Stopping point} = Brk_{on}Pt + \frac{V^2}{2 \times |A|}$$

where: $Brk_{on}Pt$ is the position on the runway (distance from runway start) where deceleration is predicted to begin begins as determined by the second apparatus; V is the speed of the aircraft as determined by the first apparatus; and $|A|$ is the absolute value of the acceleration (deceleration being a negative value) using a maximum deceleration for the aircraft; determine a corporate stopping position for the aircraft along the runway using the aircraft speed and the predicted position along a runway when the aircraft begins deceleration, the corporate stopping position based upon the aircraft performing a minimum flare maneuver prior to touchdown on the runway and wherein the corporate stopping position is determined using the equation:

$$\text{Stopping point} = Brk_{on}Pt + \frac{V^2}{2 \times |A|}$$

where: $Brk_{on}Pt$ is the position on the runway (distance from runway start) where deceleration is predicted to begin begins as determined by the second apparatus; V is the speed of the aircraft as determined by the first apparatus; and $|A|$ is the absolute value of the acceleration (deceleration being a negative value) using a corporate deceleration value for the aircraft; and display predicted indications of the minimum stopping position and the corporate stopping position at the conclusion of the landing maneuver relative to an end of the runway on a display.

13. The aircraft of claim 12, wherein the flight system determines the minimum stopping position using a maximum deceleration value for the aircraft.

14. The aircraft of claim 12, wherein the flight system determines the corporate stopping position using a minimum deceleration value for the aircraft.

15. The aircraft of claim 12, wherein the flight system displays the minimum stopping position and the corporate stopping position on the display by displaying an illustration of the runway and displaying an overlay to indicate the minimum stopping position and the corporate stopping position relative to a remaining runway distance.

16. The aircraft of claim 15, wherein the flight system also displays a trending indication to indicate whether the aircraft is trending further down the runway or trending to stop within the remaining runway distance.

17. The aircraft of claim 12, wherein the flight system also provides a runway distance caution message when the corporate stopping position exceeds the remaining runway distance and the minimum stopping position remains within a remaining runway distance.

18. The aircraft of claim 12, wherein the flight system also provides a landing distance warning or go-around message when both the corporate stopping position and the maximum stopping position exceed a remaining runway distance.

19. A non-transitory computer readable medium embodying a computer program product, said computer program product comprising: an aircraft landing program, the aircraft landing program configured to: activate a runway overrun monitor system for the aircraft as the aircraft approaches a runway during a landing maneuver; determine a minimum stopping position for the aircraft along the runway using the aircraft speed and the predicted position along a runway when the aircraft begins deceleration, the minimum stopping position based upon the aircraft performing a maximum flare maneuver prior to touchdown on the runway and wherein the minimum stopping position is determined using the equation:

$$\text{Stopping point} = Brk_{on}Pt + \frac{V^2}{2 \times |A|}$$

where: $Brk_{on}Pt$ is the position on the runway (distance from runway start) where deceleration is predicted to begin begins as determined by the second apparatus; V is the speed of the aircraft as determined by the first apparatus; and $|A|$ is the absolute value of the acceleration (deceleration being a negative value) using a maximum deceleration for the aircraft; determine a corporate stopping position for the aircraft along the runway using the aircraft speed and the predicted position along a runway when the aircraft begins deceleration, the corporate stopping position based upon the aircraft performing a minimum flare maneuver prior to touchdown on the runway and wherein the corporate stopping position is determined using the equation:

$$\text{Stopping point} = Brk_{on}Pt + \frac{V^2}{2 \times |A|}$$

where: $Brk_{on}Pt$ is the position on the runway (distance from runway start) where deceleration is predicted to begin begins as determined by the second apparatus; V is the speed of the aircraft as determined by the first apparatus; and $|A|$ is the absolute value of the acceleration (deceleration being a negative value) using a corporate deceleration value for the aircraft; and display the minimum stopping position and the corporate stopping position on a display.

20. The non-transitory computer readable medium embodying the computer program product according to claim 19, the aircraft landing program further configured to display an illustration of the runway and displaying an overlay to indicate the minimum stopping position and the corporate stopping position relative to a remaining runway distance.

21. The non-transitory computer readable medium embodying the computer program product according to claim 19, the aircraft landing program further configured to display a trending indication to indicate whether the aircraft is trending further down the runway or trending to stop within a remaining runway distance.

22. The non-transitory computer readable medium embodying the computer program product according to claim 19, the aircraft landing program further configured to provide a runway distance warning message when the corporate stopping position exceeds a remaining runway distance and the minimum stopping position remains within the remaining runway distance.

23. The non-transitory computer readable medium embodying the computer program product according to claim 19, the aircraft landing program further configured to provide a go-around message when both the corporate stopping position and the minimum stopping position exceed a remaining runway distance.

* * * * *